(12) United States Patent
Lai et al.

(10) Patent No.: US 9,670,317 B1
(45) Date of Patent: *Jun. 6, 2017

(54) HYDROPHOBIC POLYMER FOR WATER PROOFING, ANTI-CORROSION, AND ANTI-FOULING APPLICATIONS

(71) Applicant: The United States of America as Represented by the Secretary of the Navy, Washington, DC (US)

(72) Inventors: William W. Lai, Ridgecrest, CA (US); Benjamin G. Harvey, Ridgecrest, CA (US); Alfred J. Baca, Ridgecrest, CA (US); Heather Meylemans, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,239

(22) Filed: Mar. 29, 2016

(51) Int. Cl.
*C08G 61/02* (2006.01)
*C08G 65/40* (2006.01)
*C09D 5/08* (2006.01)
*C09D 5/16* (2006.01)
*C09D 171/00* (2006.01)

(52) U.S. Cl.
CPC ............... *C08G 65/40* (2013.01); *C09D 5/08* (2013.01); *C09D 5/1662* (2013.01); *C09D 171/00* (2013.01); *C08G 2150/90* (2013.01)

(58) Field of Classification Search
CPC .. H01L 51/05; H01L 51/0508; H01L 51/0545
See application file for complete search history.

(56) References Cited

U.S. PATENT DOCUMENTS 9,082,983 B1 * 7/2015 Baca ................... H01L 51/0043
9,315,623 B1 * 4/2016 Lai .......................... C08G 65/38

* cited by examiner

*Primary Examiner* — Shane Fang
(74) *Attorney, Agent, or Firm* — Charlene A. Haley

(57) ABSTRACT

A material that can be used either as a standalone or coating additive that would both repel water and resist corrosion would greatly benefit the Navy. A method of making hydrophobic polymer, including combining a perylene derived monomer with a bisphenol derived monomer to produce a polymer mixture, and condensing said polymer mixture to produce a hydrophobic polymer.

6 Claims, 3 Drawing Sheets

(A)

(B)

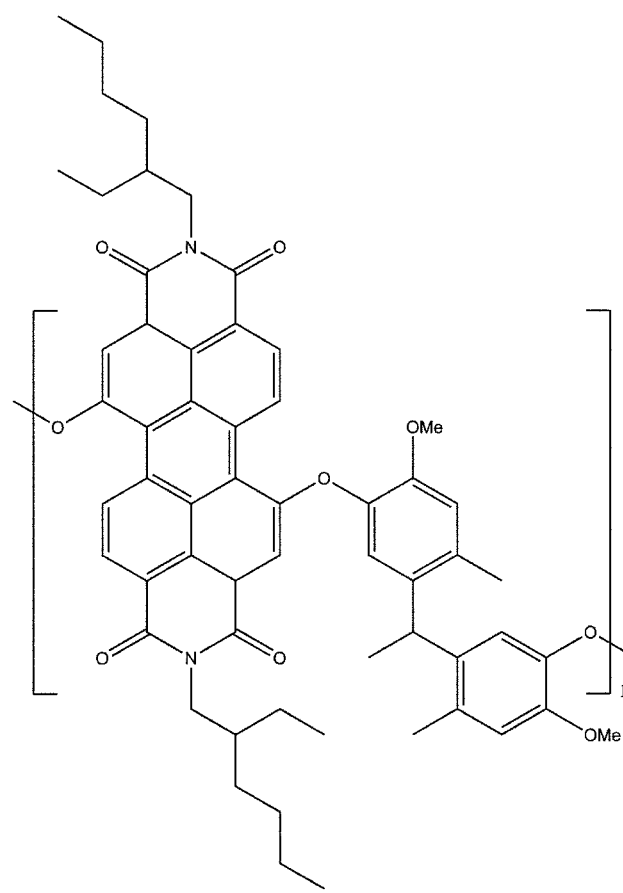
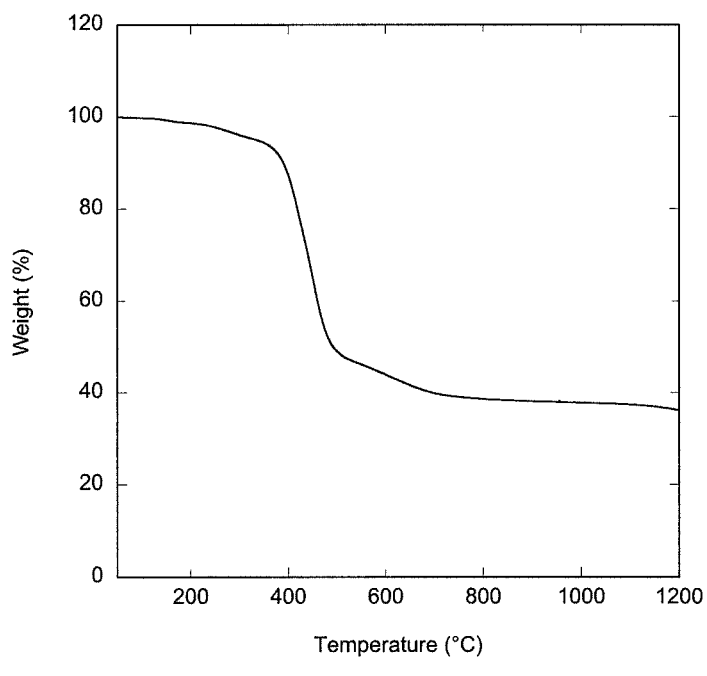
FIGURE 1A-B

HYDROPHOBIC POLYMER FOR WATERPROOFING, ANTI-CORROSION, AND ANTI-FOULING APPLICATIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to materials that can be used either as a standalone or coating additive that would both repel water and resist corrosion would greatly benefit the Navy.

BRIEF DESCRIPTION OF THE DRAWINGS

FIGS. 1A & B is a chemical structure of PB2 (A) and a graph (B) showing the TGA data shows slight weight loss at 300° C. followed by significant weight loss at 400° C. of PB2, according to embodiments of the invention.

Figure 2:
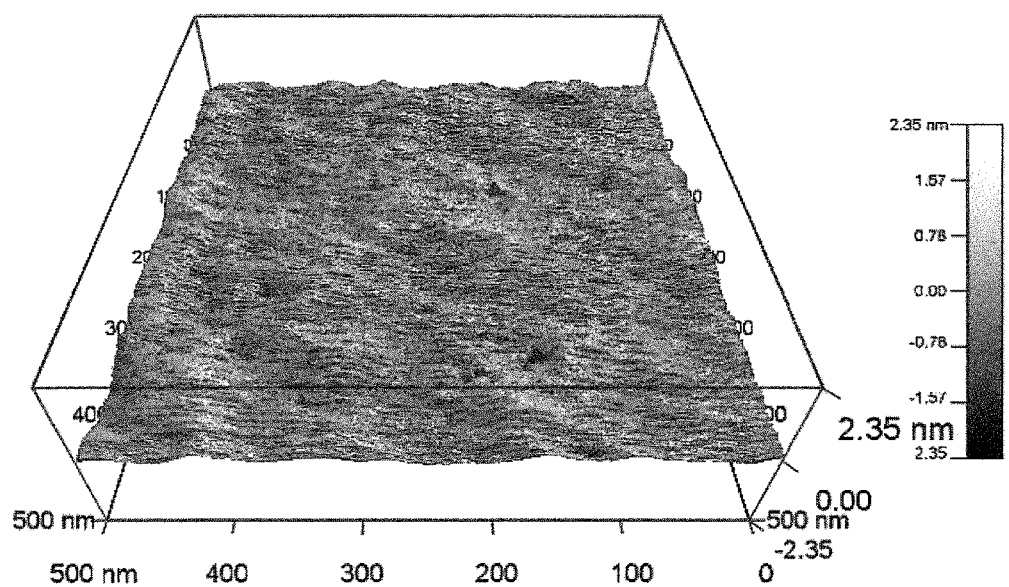
FIG. 2 is a diagram showing PB2 film morphology (3-D), according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to materials that can be used either as a standalone or coating additive that would both repel water and resist corrosion would greatly benefit the Navy.

The annual cost to repair, replace or maintain service vehicles and buildings from water damage runs into the tens of billions. A material that can be used either as a standalone or coating additive that would both repel water and resist corrosion would greatly benefit the Navy.

Water damage, ranging from extremes, such as corrosion induced mechanical failure to something as benign as water stains, are problems that the Navy has to deal with on a daily basis. The annual cost caused by water damage to service vehicles and buildings run into the tens of billions. Since a water environment is a way of life for the Navy and unavoidable, measures must be taken to extend the lifespan of service vehicles and buildings such that maintenance and replacement costs are minimized. Saccate pollen grains are known to be extremely hydrophobic. In fact, they are often sold in science shops as a way to demonstrate hydrophobicity. Anyone who has handled these materials knows that they are what is commonly termed "unwettable". We will now describe a polymer that behaves very similarly to saccate pollen grains, with the one advantage being that as a polymer, it can be made into a coating, either as a standalone or as a drop-in additive to existing polymers.

There have been plenty of materials that are proposed to simulate the water resisting properties seen in nature. Commercial companies, such as Lotus Leaf Coatings use complex systems that require thermal curing after their coatings have been applied to attain the desired effect, which would severely limit the utility of the material. Materials that repel water in a way that results in water "sheeting" off a surface have the ability to greatly reduce water streaks and corrosion. These are two examples, one having to do with aesthetics and one having to do with destruction, with a loss in time and resources being the common denominator.

The polymer (PB2) that we are describing is the condensation product between a perylene derived monomer and a bisphenol derived monomer (FIG. 1A). The condensation reaction is carried out in standard dehydrating conditions, comprising of a dehydrating acid and heat. The reaction is carried out at elevated temperatures until the desired molecular weight polymers are achieved. This polymer does not require any post application thermal cures and is readily soluble in common organic solvents such as THF, chloroform and chlorobenzene. Its water resistant properties are very similar to saccate pollen grains. After a week in a water soxhlet in constant contact with hot (greater than SOC) water, the material remained a dry powder. Its thermal properties have also been measured. Its TGA data shows slight weight loss at 300° C. followed by significant weight loss at 400° C. (FIG. 1B).

Figure 3:
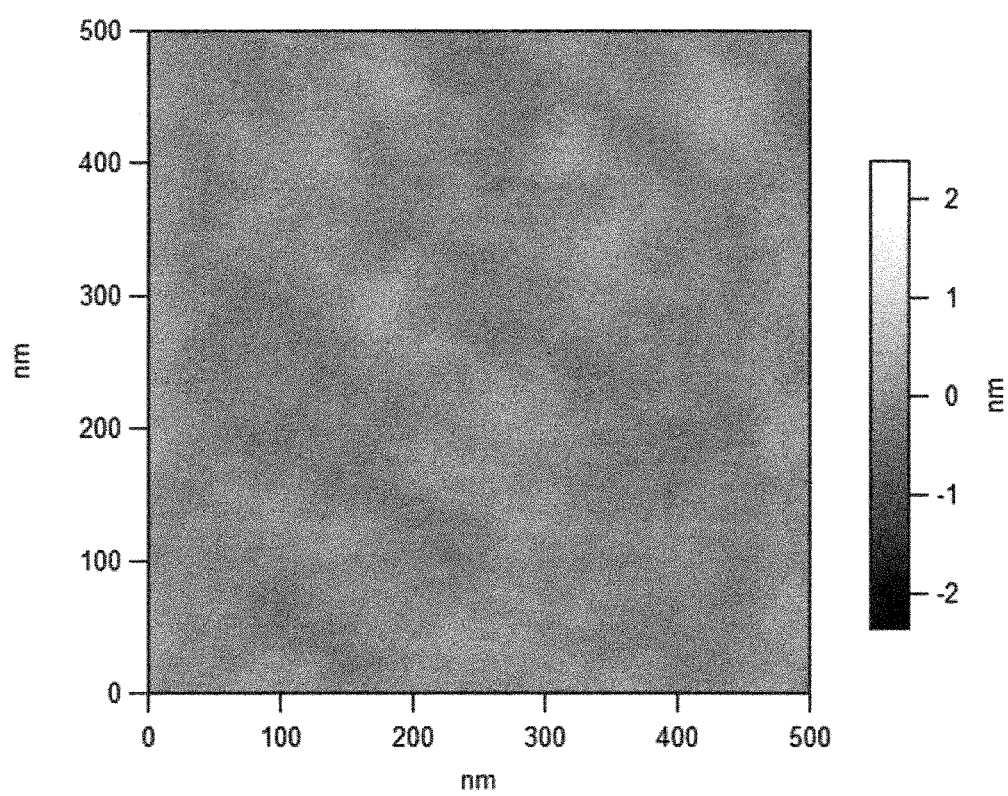
FIG. 3 is a diagram showing PB2 film morphology, according to embodiments of the invention.

The polymer also forms very homogenous uniform films with ultra smooth surfaces. AFMs, where the peaks and valleys vary within 2-3 nm (FIGS. 2 and 3). In contrast, similar polymers made at the same time, using the same conditions result in a much rougher surface. Partly due to the surface energy that repels the water might also repel itself, resulting in a film that is uniformly dispersed. Contact angle measurements were taken and are within the range comparable to that of a lotus leaf like materials.

Embodiments of the invention generally relate to a polymer having the structure and formula: wherein "n" ranges from about 8 and about 100.

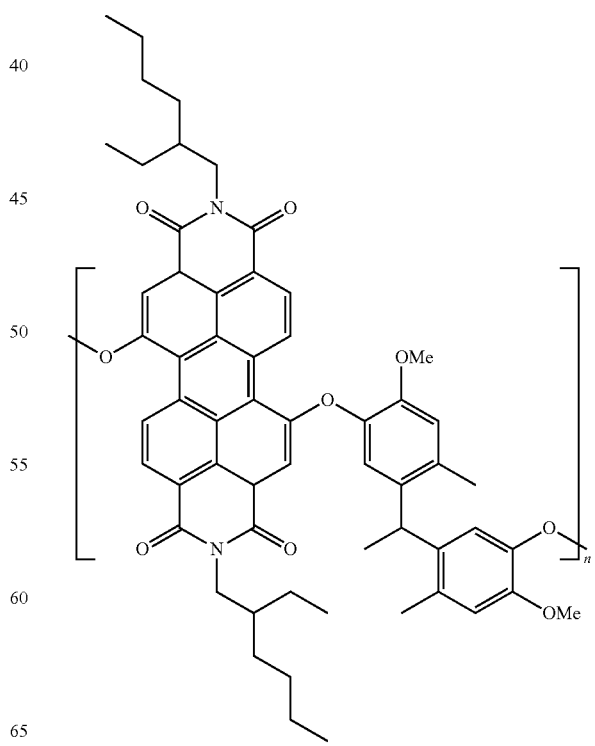

Another aspect of the invention generally relates to methods of making hydrophobic polymers including, combining a perylene derived monomer with a bisphenol derived monomer to produce a polymer mixture and condensing the polymer mixture to produce a hydrophobic polymer. Embodiments further include dissolving the hydrophobic polymer in an organic solvent. Embodiments further include forming the hydrophobic polymer solution into a homogenous uniform film with ultra-smooth surfaces. Ultra smooth is defined as having a roughness less than 1 nanometer. In embodiments, the organic solvent is selected from the group consisting of tetrahydrofuran (THF), chloroform, and chlorobenzene.

Another aspect of the invention generally relates to processes for preventing corrosion, fouling or water proofing of a surface, which includes coating or treating the surface with a

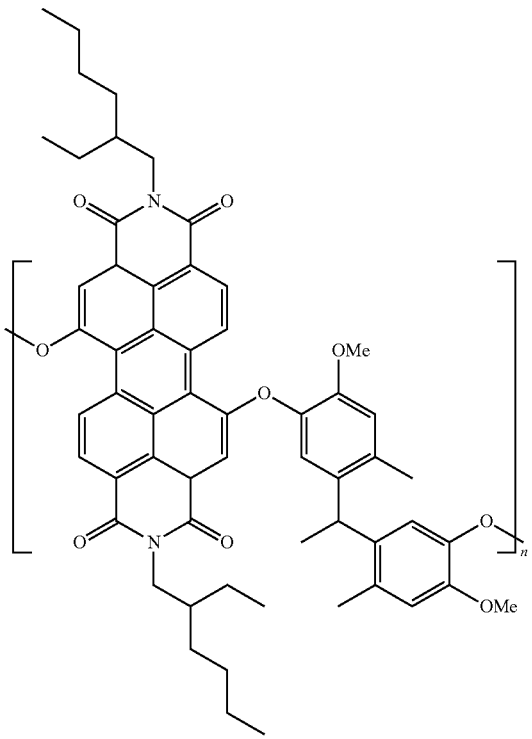

hydrophobic polymer having the structure or formula of: wherein "n" ranges from about 8 and about 100.

Prophetic Examples

Prophetic examples are for illustration purposes only and not to be used to limit any of the embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A polymer, comprising to structure and formula:

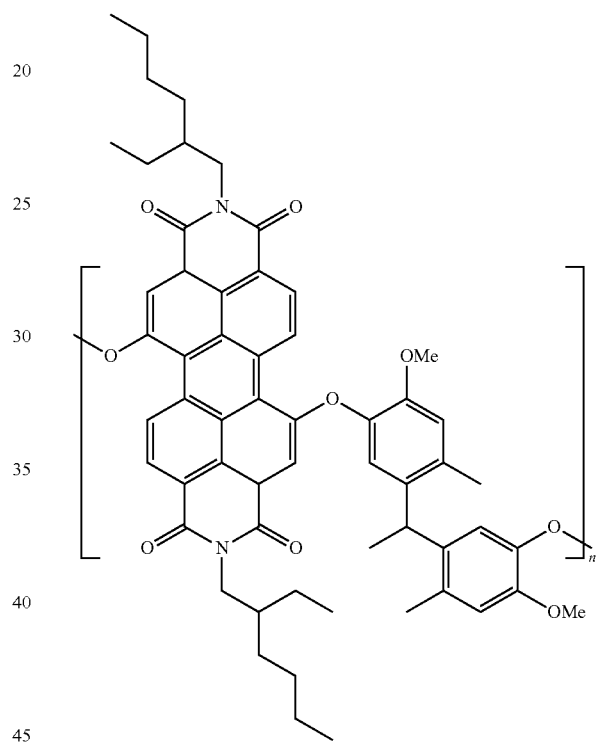

wherein "n" ranges from about 8 and about 100.

2. A method of making hydrophobic polymer, comprising:
   combining a perylene derived monomer with a bisphenol derived monomer to produce a polymer mixture; and
   condensing said polymer mixture to produce a hydrophobic polymer.

3. The method according to claim 2, further comprising dissolving said hydrophobic polymer in an organic solvent.

4. The method according to claim 3, further comprising forming said hydrophobic polymer solution into a homogenous uniform film with ultra-smooth surfaces.

5. The method according to claim 3, wherein said organic solvent is selected from the group consisting of tetrahydrofuran (THF), chloroform, and chlorobenzene.

6. A process for preventing corrosion, fouling or water proofing of a surface, which comprises: coating or treating the surface with a hydrophobic polymer having the structure or formula of:

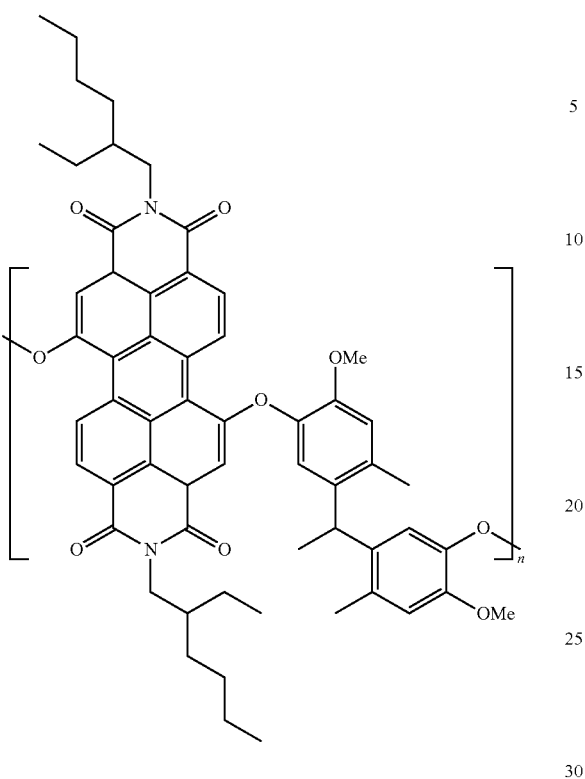
wherein "n" ranges from about 8 and about 100.
* * * * *